United States Patent [19]

Fumagalli

[11] Patent Number: 5,299,618
[45] Date of Patent: Apr. 5, 1994

[54] METHOD FOR RECOVERING FOUNDRY SAND BY ROASTING

[76] Inventor: Pio Fumagalli, Via Umberto, 24 - 13030, Verrone, Italy

[21] Appl. No.: 859,316
[22] PCT Filed: Nov. 23, 1990
[86] PCT No.: PCT/IT90/00096
§ 371 Date: May 28, 1992
§ 102(e) Date: May 28, 1992
[87] PCT Pub. No.: WO91/08068
PCT Pub. Date: Jun. 13, 1991

[30] Foreign Application Priority Data

Nov. 28, 1989 [IT] Italy ................................ 68050-A

[51] Int. Cl.⁵ .............................................. B22C 5/00
[52] U.S. Cl. .................................. 164/5; 110/236; 110/346; 241/5; 241/18; 241/DIG. 10
[58] Field of Search ................. 164/5; 241/DIG. 10, 241/5, 18; 110/236, 245, 346, 246

[56] References Cited

U.S. PATENT DOCUMENTS

| | | | |
|---|---|---|---|
| 3,433,186 | 3/1969 | Koecher | 110/246 |
| 4,427,375 | 1/1984 | DiRosa | 110/245 X |
| 4,429,642 | 2/1984 | Deve | 110/346 X |
| 4,681,267 | 7/1987 | Leidel et al. | 241/DIG. 10 X |
| 4,738,615 | 4/1988 | Bailey et al. | 110/245 X |
| 4,821,654 | 4/1989 | Becker et al. | 110/346 X |

FOREIGN PATENT DOCUMENTS

| | | | |
|---|---|---|---|
| 56-117856 | 9/1981 | Japan | 164/5 |
| 59-215242 | 12/1984 | Japan | 164/5 |
| 60-216949 | 10/1985 | Japan | 164/5 |
| 60-250847 | 12/1985 | Japan | 164/5 |
| 63-180340 | 7/1988 | Japan | 164/5 |

*Primary Examiner*—J. Reed Batten, Jr.
*Attorney, Agent, or Firm*—Sixbey, Friedman, Leedom & Ferguson

[57] ABSTRACT

The method permits recovery of spent foundry sand for reuse by eliminating, by combustion, the organic and carbon substances with which the spent sand is impregnated; spent sand, after grinding to a uniform grain size, is placed into a cylindrical container (2) inclined with respect to the vertical and rotated slowly (4-6 revolutions per minute); then, a stream of oxygen is blown into the base of the container through a distributor (5) which uniformly distributes it into the spent sand mass (20), and local combustion is initiated on the surface of the sand mass, at the top of container, by a burner (31); finally the burner is extinguished whilst the delivery of the oxygen stream is maintained and the combustion proceeds and feeds itself by the effect of a progressive descent of the flame front (30) towards the base of the container until complete destruction of the organic and carbon substances contained in the sand has taken place.

9 Claims, 2 Drawing Sheets

– 5,299,618 –

METHOD FOR RECOVERING FOUNDRY SAND BY ROASTING

TECHNICAL FIELD

The present invention relates to a method for recovering spent foundry sand by roasting.

It is known that spent sand constituting the residue of molten metal casting processes constitutes a serious industrial problem both from the ecological point of view and from the strictly economic point of view. From the ecological point of view such spent sand is often considered as highly polluted special waste (having a high content of heavy metals and phenols), which it is necessary to spread in suitable dumps which may need to be authorised and equipped for this purpose. From the economic point of view the spreading of such spent sands as waste constitutes the loss of significant quantities of foundry sand, the acquisition of which is becoming ever more difficult and expensive due to the progressive exhaustion of the quarries from which these are extracted.

BACKGROUND ART

To resolve these problems numerous processes for treatment of the spent sand have been proposed for the purpose of recovering it, or at least of reducing the polluting charge, among which the most common are the wet process and the roasting or calcining process.

In the first case, the spent sand the granules of which are covered in particles of carbon and organic material which constitutes the residue of the chemical binding materials utilised to prepare the moulds for casting, are dispersed in an aqueous medium where the friction between the granules due to the irregular motion of these in the aqueous medium causes mechanical removal of the polluting substances (in particular carbon) which then stratify, by the effect of the different specific gravities, permitting the clear separation of the two solid phases (cleaned sand and removed residues); this process is very simple from the equipment point of view, but has the disadvantage of leaving the sand wet so that it is necessary to dry it, with consequent increase in costs; moreover, this process is particularly suitable for the so-called "black earth" where the majority of the residue is carbon, but is less effective in the case of organic pollutants.

In the second case, see e.g. U.S. Pat. No. 2,553,318, roasting to calcination of the spent sand is obtained by treating it with a current of hot gases in such a way as to cause elimination of the organic and carbon residues in gaseous form by direct or subsequent pyrolysis and/or combustion. The possibility of recovering the heat of combustion of these substances for pre-heating the combustion air makes it possible to contain the operating costs. On the other hand the costs of the installation are rather high in that the process is typically performed in rotating furnaces or, more frequently, by means of fluidised bed installations. Therefore this type of process can only be economically performed using large scale installations, which cannot be managed by medium and small foundries (which are those which generate a good part of the spent sand) at least without recourse to cooperatives or other similar community initiatives. However, even in this case the method of calcination is not free from disadvantages: first of all it is constrained to work in batches in that it is not possible to mix sand having different provenances to effect the treatment because this would involve the risk, for example, of mixing basic sand with acid sand, with the obvious consequences. Moreover, if there are present in the sand residues of low melting point metals (Cu, Zn, Sn, Pb) these can melt during the treatment, percolating through the fluidised bed and obstructing the holes through which the gas flow sustaining the calcination is delivered. As a direct consequence, practically all spent sand coming from non-ferrous metal workings, which are the most polluted, cannot be treated with this method.

SUMMARY OF INVENTION

The object of the invention is that of providing a method for the treatment of spent foundry sand which will be economic, which can be performed even on small batches of sand, and therefore directly adjacent the foundries, even small foundries, and which makes it possible to treat, in particular, sands coming from non-ferrous metal workings, in all cases permitting the recovery of the major part of the treated sand for subsequent reutilisation.

The said object is achieved by the invention, which relates to a method for effecting the recovery of spent foundry sand containing organic and carbon substances by roasting thereof, in manners described in greater detail below.

BRIEF DESCRIPTION OF DRAWINGS

For a better understanding of the invention a non-limitative embodiment thereof will now be described with reference to the attached drawings, in which.

BEST MODE FOR CARRYING OUT THE INVENTION

In substance the applicant has surprisingly discovered that it is possible to initiate and maintain in a mass of spent sand, even of small or very small volume, an endogenous combustion process which progressively involves successive layers of small thickness of the sand mass, starting from the surface and progressing to the base of the sand mass, and which is sustained by the complete combustion of the organic and carbon polluting substances present in the mass of spent sand (accounting for about 2–8% of the total mass of the spent sand), which are thus completely eliminated by oxidation to carbon dioxide. In this way it is possible to treat, either in a discontinuous or "batch" manner, or in a continuous manner, sand masses of any quantity, with practically no energy consumption or, at any rate a very low energy consumption; moreover it is possible to treat sand of any nature and provenance in that the combustion no longer involves the whole of the sand mass simultaneously but, on the contrary, only a small part progressively descending through it so that low melting point metals which may be present cannot melt and percolate in the liquid state to the bottom of the sand mass in that they solidify, consequently being retained, as soon as the combustion phase moves beyond that portion of the sand mass. These results are obtained by arranging the spent sand mass to be treated in a receptacle or container made of any material resistant to the combustion temperature of the sand, preferably stainless steel, and blowing through the sand mass, at the base of the container, a stream of pure oxygen or, more generally, a stream of any gas which has been oxygenated, or rather containing a percentage of oxygen greater than that of the ambient air (21% by volume, 23% by weight), for example constituted by ambient air enriched with pure oxygen; this gas stream is generated at ambient temperature, for example by deriving the oxygen from suitable storage receptacles where it is conserved in the liquid state, and is then passed through the sand mass at ambient temperature until it completely permeates this and filters through to its surface; at this point combustion of the surface layer of the sand mass is initiated, for example by utilising a gas or gas/oil burner, which generates a live flame which is directed onto the upper surface of the sand mass at the top of the container; then the live flame is removed, the burner extinguished and the oxygenated gas flow maintained, possibly progressively reducing in pressure, in such a way as to cause a progressive descent of the flame front gradually as the combustible substances present in the sand are consumed, moving towards the base of the sand mass.

Figure 1:
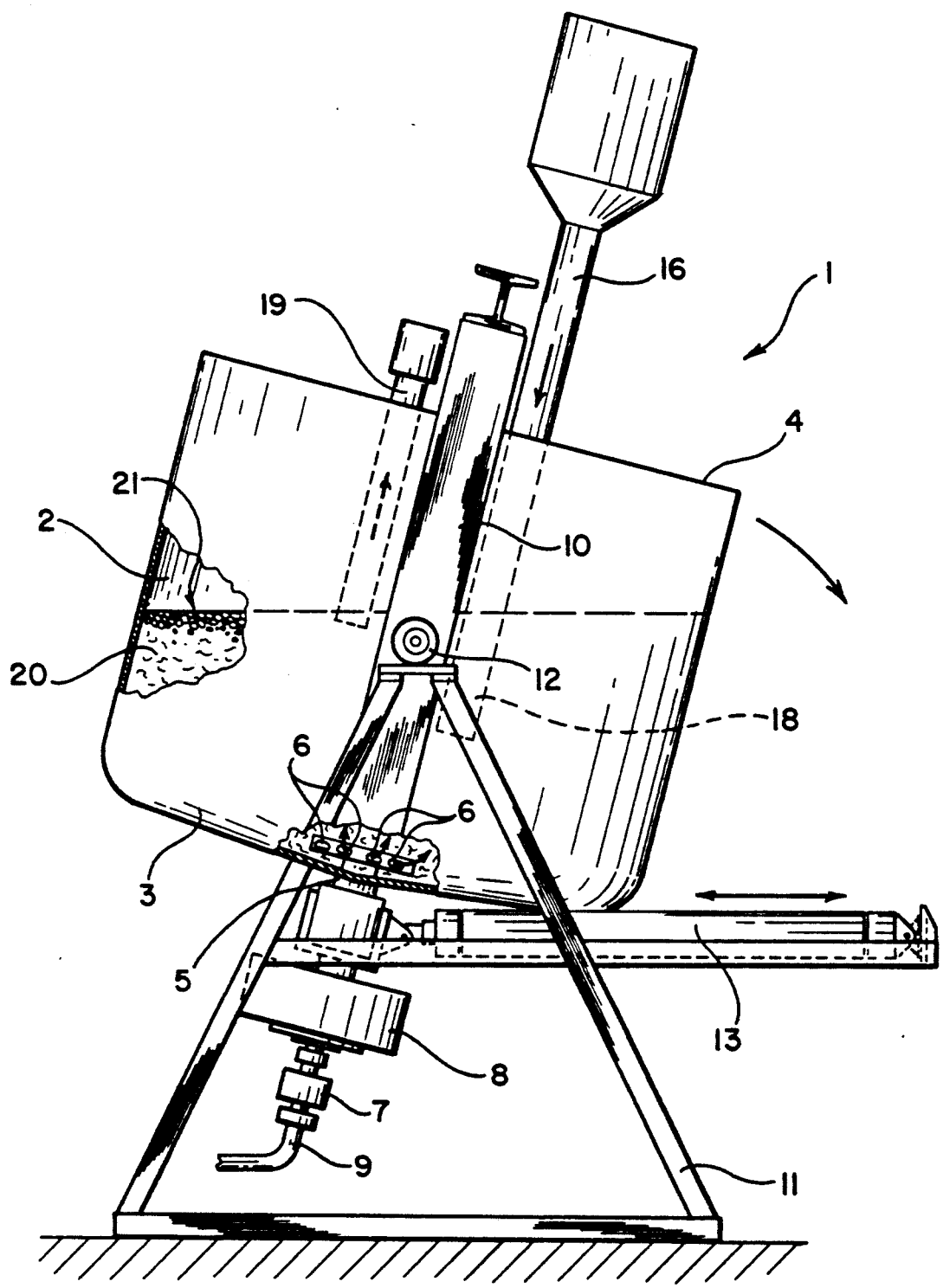
FIG. 1 is a side view of apparatus adapted to perform the method of the invention.

With reference to FIGS. 1 to 4, a possible embodiment of apparatus 1 adapted to perform the method of the invention is schematically illustrated together with the principal stages of this method, illustrated with reference to use of the apparatus of FIG. 1. The apparatus 1 essentially comprises a cup-shape receptacle or container 2 made of steel, preferably stainless steel (for example AISI 316L) having cylindrical symmetry and delimited at the bottom by a dished base wall 3 and at the top by an open circular mouth 4, and a delivery outlet 5 fixed internally to the container 2, passing through the bottom wall 3 in an axial position, and provided with a plurality of lateral discharge nozzles 6; the inlet or distributor 5 is connected by means of a known rotatable coupling 7 with an inlet tube 9 for an oxygenated gas stream, preferably constituted by pure oxygen, schematically indicated by the arrows; the receptacle 2 is supported freely rotatably by a frame 10 provided with a drive motor 8 adapted to cause the cylindrical container 2 to rotate slowly (at a speed lying between 3 and 6 revolutions per minute) about its axis of symmetry; the frame 10 is in turn supported by a structure 11 to which it is pivotally fixed on pins 12 for turning motion in the direction of the arrow under the control of an actuator 13, in such a way that the container 2 can be tipped, for example to effect emptying of a sand mass 20 contained therein in use, and/or maintained with its axis of symmetry inclined, in such a way as to be able to incline the axis of rotation, indicated as A in FIG. 3, at a predetermined angle with respect to the vertical during normal operation. In the specific example illustrated in FIG. 1, for the purpose of making the method of treatment of spent sand according to the invention continuous, the apparatus 1 can further include a known loading hopper 16 which is shaped and positioned in such a way that its lower end 18 is always immersed within the sand mass 20 in the course of regeneration, and suction means, for example defined by a known elevator 19 mounted fixedly to the receptacle 2 together with and close to the hopper 16 and dipping into an upper surface layer 21 of the sand mass 20.

Figure 2:
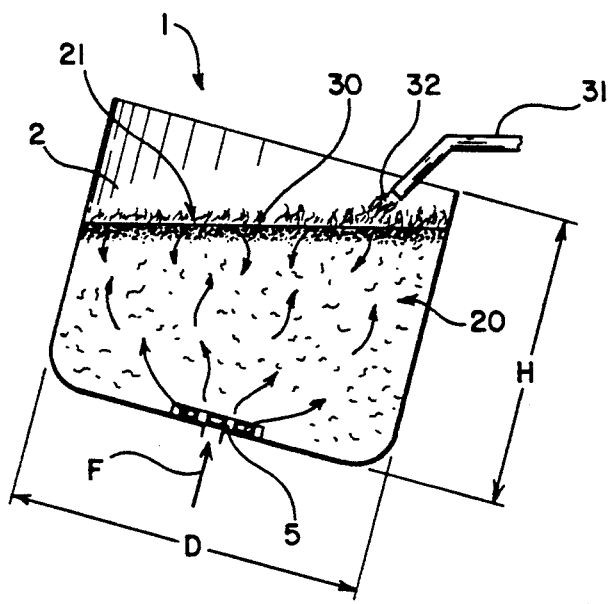
FIGS. 2, 3 and 4 schematically illustrate several stages in the method of the invention.
Figure 3:
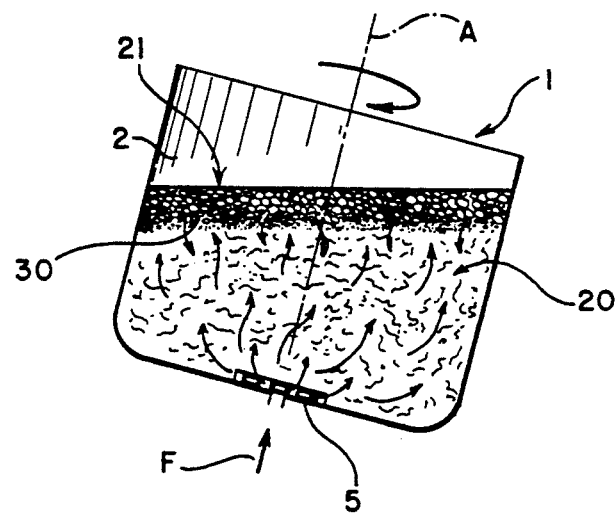
Figure 4:
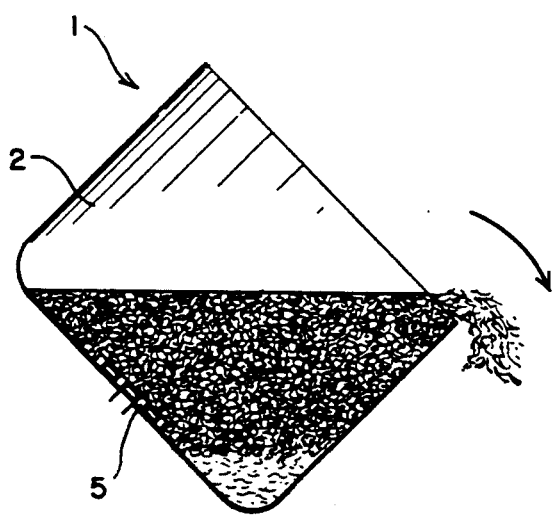

With particular reference to FIGS. 2 to 4 and with reference to the discontinuous or "batch" manner of performing the method of the invention, the spent sand mass 20 is first subjected to a known crushing treatment not illustrated for simplicity, during which the grain size of the sand is rendered uniform, and the clots of sand and binding substances are broken down and crumbled into small pieces of dimensions not greater than 3 mm. Then the spent sand mass 20 is loaded into the container 2: to obtain satisfactory results is has been found that this must have a ratio between its diameter D and its height H lying between 0.8 and 1.2, and that it is suitable to fill only a fraction of the volume of the container 2 with a volume of sand 20, lying between 70 and 90% of the total volume of the container. At this point the container 2 is positioned with its axis inclined by operating the actuator 13, and is put into rotation by operating the motor 8; simultaneously there commences delivery into the sand mass 20, at the base thereof, of a stream F (indicated by the arrows) of oxygen (or of oxygenated air) through the inlet 5. To obtain satisfactory results and, above all, to guarantee a regular development of the endogenous combustion process in the sand mass 20, it is necessary to keep the container 2 inclined with respect to the vertical by an angle lying between 5° and 15° (with the container 2 in rotational at 3-6 revolutions per minute) and to deliver the oxygenated stream F at a pressure not greater than 4 bar and, preferably, lying between 2 and 4 bar and with a flow rate lying between 70 and 130 liters for each kilogram of spent sand present.

As soon as the stationary flow conditions of the gas stream F have been reached and this is distributed in a uniform manner within the sand mass 20 and commences to filter through to the surface 21 at the top of the sand mass, a flame front 30 is created at the top 4 of the container 2. In the specific example this is achieved by utilising a known burner 31 by means of which a live flame 32 is directed onto the surface 21; when the flame 32 strikes the sand granules covered in combustible substances and surrounded by a gas environment rich in oxygen it triggers local combustion of the surface layer of the mass 20, which combustion propagates over the whole of the surface layer, notwithstanding the scarcity of fuel, by the effect of the hyper oxygenation of this layer. However, also due to the scarcity of the fuel, the heat produced is sufficient to maintain in combustion only a small portion of the mass 20, namely just that corresponding to the surface layer, without any possibility that a simultaneous combustion of the whole of the sand mass 20 might be initiated. At this point the flame 32, is removed, the burner 31 extinguished and the endogenous combustion of the mass 20 is maintained by continuing to deliver oxygen through it; gradually as the combustible products in the surface layer are consumed, the flame front 30 descends in the direction of the arrows (FIG. 3) thereby involving the immediately underlying layer, whilst the overlying combusted layer becomes extinguished, and thus the combustion process proceeds layer by layer until it reaches the bottom of the sand mass 20 and combustion of the organic and carbon substances contained in it is complete. The maintenance of the container 2 in the inclined position and in slow rotation produces a slow mixing of the sand mass 20 contained therein, which prevents (or at least compensates) the creation of preferential paths for the passage of the oxygenated gas flow F in the mass 20, which phenomenon, by bringing in excessive localised oxygenation, could result in the initiation of rather violent localised combustion of an explosive character, leaving the neighbouring regions with a reduced flow of oxygen, with the risk of suffocating the endogenous combustion in the sand mass 20.

Once all the combustible substances present in the sand mass 20 have been consumed, or rather once the combustion process has passed through the whole of the mass 20, with the flame front 30 descending down to the base thereof, the combustion becomes exhausted at the base 3 of the container 2, the flame front 30 extinguishes, the flow F of gas is suspended and the sand mass 20, which at this point is totally regenerated in that the substances which were rendering it unusable (phenols, furanic resins, carbon particles) have been totally eliminated, is discharged from the container 2, for example by tipping, and can be reutilised as virgin foundry sand.

The process described can also be performed in a continuous manner without substantially modifying the apparatus 1, except for the addition of the hopper 16 and the elevator 19; in this case, after having effected a first charging of the container 2 and having started the combustion at the surface 21 in the previously described manner, the container 2 is supplied with a certain flow rate of new spent sand via the hopper 16 into the region of the sand mass 20 just "below" the flame front 30, or rather in the region which is about to be reached thereby, whilst simultaneously an equal amount of already combusted and, therefore, already purified sand is withdrawn from the zone of the sand mass 20 immediately past the flame front 30 by means of the elevator 19. In this way the level of the sand mass 20 in the container 2 remains constant and the flame front 30 is maintained dynamically stationary underneath the aspirator means and above the end 18 of the hopper 19; "dynamically" in the sense that, in effect, the flame front 30 descends normally, as in the preceding case, but is also substantially raised by the same amount by the introduction of new unburnt sand beneath the level thereof; the maintenance of the container 2 inclined and in slow rotation is in this case essential for the purpose of permitting the necessary slow mixing of newly introduced unburnt material in the region occupied by the flame front 30 and to remove from this the already consumed material, to make it float on the surface 21.

The present invention will now be further described by means of several not limitative examples.

EXAMPLE I

Sample Preparation

Two different batches of spent foundry sand were selected: sand of type (a) coming from the knocking out of casting moulds containing cores and therefore polluted with phenolic and furanic resins; sand of type (b) coming from hot formed cores bound with phenolic resins. For each type of sand chosen there were prepared ten samples of 30 Kg each indicated with numerals from 1 to 20; in order to obtain representative samples each of these was taken from ten different points of a heap of spent sand.

The first of each of the ten samples in each series was left untouched, whilst the remaining nine were subjected to differentiated crumbling in such a way as to obtain samples with very small lumps so as to achieve, in the final sample, a grain size equal to that of the starting sand before use.

EXAMPLE II

Performing Combustion Tests

Apparatus such as that illustrated and described hereinabove with reference to FIG. 1 was provided, constituted by a cylindrical container of diameter 300 mm with a dished bottom made of AISI 316L stainless steel provided in the centre of the bottom with a valve having a conical seat protected by a stainless steel casing with lateral nozzles for the distribution of oxygen, connected to a liquid oxygen reservoir by means of a regulator, closure valves and a connection tube of copper, and held for rotation by a tiltable sub-frame. The apparatus was provided with a flowmeter and a manometer on the connection tube and three thermocouples protected by stainless steel sheaths disposed within the container.

For each sample a measured quantity of sand was introduced into the container to 370 mm over the oxygen valve; the delivery of oxygen was then opened and a methane burner used to initiate the combustion on the surface of a sand bed. The burner was then extinguished and the combustion proceeded towards the bottom supporting itself on a well defined regular front. Apart from intermittent damage to the thermocouples no disadvantages were encountered; the temperature in the combustion region had a maximum of 1000°-1100° C. on the vertical above the valve and a minimum of 500°-600° C. at the container walls. The other results obtained are plotted in the attached table 1.

EXAMPLE III

Chemical Analysis of the Sand

The treated sand samples were subsequently subjected to chemical analysis to detect phenol; 500 grams of burnt sand broken down and sieved through a 1 mm screen were put into a 2 liter flask and 600 ml of distilled water were added, regulated to a pH of 2-3 by the addition of phosphoric acid at 85% and 3 gm of $CuSO_4.5H_2O$. The whole was subjected to distillation at atmospheric pressure to collect 500 ml of distillate. The phenol content in 100 ml of this distillate was determined with spectrophotometric methods according to W Leithe (Die analyse der organischen Verunreinigungen in Trink-Brauchund Abwassern, page 98). The phenol content of the samples was found to be less than the sensitivity of the method of analysis (1 mgr/Kg of sample).

TABLE 1

| OXYCOMBUSTION TESTS ON FOUNDRY SAND WITH LABORATORY DEVICE | | | | | | | |
|---|---|---|---|---|---|---|---|
| Type of sand | Sample No | Sand grain size | Head with respect to bottom (mm) | Ignition initiation time (m') | $O_2$ pressure (in bar) | $O_2$ flow rate (mc/h) | Notes |
| Sand of type a (from moulds with furanic and phenolic resins | 1 | all in mm | 370 | 10-12 | 1 | Flowmeter signal off the scale | Excessive dispersion of $O_2$ |
| Sand of type a (from moulds with furanic and phenolic resins | 2 | 60-80 | 370 | | 1 | Flowmeter signal off the scale | Excessive dispersion of $O_2$ |

TABLE 1-continued
OXYCOMBUSTION TESTS ON FOUNDRY SAND WITH LABORATORY DEVICE

| Type of sand | Sample No | Sand grain size | Head with respect to bottom (mm) | Ignition initiation time (m') | $O_2$ pressure (in bar) | $O_2$ flow rate (mc/h) | Notes |
|---|---|---|---|---|---|---|---|
| Sand of type a (from moulds with furanic and phenolic resins | 3 | 50–60 | 370 | | 1 | Flowmeter signal off the scale | Excessive dispersion of $O_2$ |
| Sand of type a (from moulds with furanic and phenolic resins | 4 | 40–50 | 370 | 4–6 | 1.5 | Flowmeter signal off the scale | High dispersion of $O_2$ |
| Sand of type a (from moulds with furanic and phenolic resins | 5 | 30–40 | 370 | | 1.5 | Flowmeter signal off the scale | High dispersion of $O_2$ |
| Sand of type a (from moulds with furanic and phenolic resins | 6 | 20–30 | 370 | | 2 | Flowmeter signal off the scale | High dispersion of $O_2$ |
| Sand of type a (from moulds with furanic and phenolic resins | 7 | 10–20 | 370 | | 2.8 | Flowmeter signal off the scale | High dispersion of $O_2$ |
| Sand of type a (from moulds with furanic and phenolic resins | 8 | 5–10 | 370 | | 3 | Flowmeter signal off the scale | Modest dispersion of $O_2$ |
| Sand of type a (from moulds with furanic and phenolic resins | 9 | 3–5 | 370 | | 4 | Flowmeter signal off the scale | No dispersion of $O_2$ evident |
| Sand of type a (from moulds with furanic and phenolic resins | 10 | 0.5–1 | 370 | 2–3 | 4 | 12 | No dispersion of $O_2$ evident |
| Sand type b (from hot cores with phenolic resin | 1 | " | " | 6–8 | " | Flowmeter signal off the scale | No dispersion of $O_2$ evident |
| Sand type b (from hot cores with phenolic resin | 2 | " | " | | " | Flowmeter signal off the scale | No dipersion of $O_2$ evident |
| Sand type b (from hot cores with phenolic resin | 3 | " | " | | " | Flowmeter signal off the scale | No dispersion of $O_2$ evident |
| Sand type b (from hot cores with phenolic resin | 4 | " | " | | " | Flowmeter signal off the scale | No dispersion of $O_2$ evident |
| Sand type b (from hot cores with phenolic resin | 5 | " | " | 3–5 | " | Flowmeter signal off the scale | No dispersion of $O_2$ evident |
| Sand type b (from hot cores with phenolic resin | 6 | " | " | | " | Flowmeter signal off the scale | No dispersion of $O_2$ evident |
| Sand type b (from hot cores with phenolic resin | 7 | " | " | | " | Flowmeter signal off the scale | No dispersion of $O_2$ evident |
| Sand type b (from hot cores with phenolic resin | 8 | " | " | | " | Flowmeter signal off the scale | No dispersion of $O_2$ evident |
| Sand type b (from hot cores with phenolic resin | 9 | " | " | | " | Flowmeter signal off the scale | No dispersion of $O_2$ evident |
| Sand type b (from hot cores with phenolic resin | 10 | " | " | 1–2 | " | 12 | No dispersion of $O_2$ evident |

I claim:

1. A method of recovering foundry sand by roasting a mass of spent foundry sand containing organic and carbon combustible substances comprising the steps of:
   introducing said mass of spent foundry sand into a container;
   blowing a stream of a gas having an oxygen content greater than that of ambient air into said container at the bottom thereof in a manner causing the gas to permeate substantially uniformly through the entirety of said mass of spent foundry sand;
   creating a flame front at the top of said mass of spent foundry sand in the container by directing a live flame onto an upper surface of said mass;
   removing said live flame from the surface of the sand mass; and
   producing a gradual progressive motion of the flame front through portions of the sand mass as the combustible substances present in the mass of spent foundry sand are consumed while continuing to blow said stream of gas through the sand mass until complete combustion of the organic and carbon substances has taken place.

2. A method according to claim 1, characterized in by the fact that only a fraction of the volume of the said container (2) is filled with the said sand mass (20), the fraction lying between 70 and 90% of the total volume thereof.

3. A method according to claim 1, characterised by the fact that a container (2) having cylindrical symmetry is used, which is caused to rotate slowly about its axis of symmetry (A) maintaining this axis inclined with respect to the vertical.

4. A method according to claim 3, characterised by the fact that the said container (2) is caused to rotate at a speed of 3-6 revolutions per minute, maintaining the axis of rotation (A) inclined at an angle lying between 5° and 15° to the vertical.

5. A method according to claim 1, characterised by the fact that the said gas stream (F) is composed of pure oxygen which is supplied to the sand mass (20) through an inlet (5) fixed to the bottom of the container and provided with a plurality of lateral discharge nozzles.

6. A method according to claim 1, characterised by the fact that a cylindrical container (2) having a diameter-to-height ratio lying between 0.8 and 1.2 is used, supplying to the sand mass a gas stream pressurised at a pressure lying between 2 and 4 bar and having a flow rate of oxygen lying between 70 and 130 liters for each kilogram of sand.

7. A method according to claim 1, characterised by the fact that before introducing the spent sand mass (20) into the container the sand mass (20) is broken up so as to obtain a sand mass having a substantially uniform grain size with lumps of maximum dimensions of 3 mm.

8. A method according to claim 1, characterised by the fact that when the combustion of the said sand mass (20) is completed this latter is discharged from the container, after having stopped the said oxygenated gas flow, by tipping the container itself.

9. A method according to claim 1, characterised by the fact that the said sand mass is introduced continuously into the said container (2) via a hopper (16) having a lower end (18) immersed within the sand mass present in the container, whilst the burnt sand is continuously extracted from the container by suction means (19) dipping into the sand mass present in the container substantially at the surface (21) thereof, the rate of supply of spent sand and of extraction of combusted sand being identical and such as to maintain the flame front (30) dynamically stationary beneath the said suction means and above the lower end of the charging hopper.

* * * * *

UNITED STATES PATENT AND TRADEMARK OFFICE
CERTIFICATE OF CORRECTION

PATENT NO. : 5,299,618
DATED : April 5, 1994
INVENTOR(S) : Pio Fumagalli

It is certified that error appears in the above-indentified patent and that said Letters Patent is hereby corrected as shown below:

Title page, item [30], change "68050-A" to --68050-A/89--

Signed and Sealed this

Thirteenth Day of September, 1994

Attest:

BRUCE LEHMAN

Attesting Officer     Commissioner of Patents and Trademarks